United States Patent [19]

Le Bourlot et al.

[11] Patent Number: 4,578,543
[45] Date of Patent: Mar. 25, 1986

[54] DIGITAL ECHO CANCELLER

[75] Inventors: Jean Le Bourlot, Saint-Cheron; Michel Lévy, Gometz-la-Ville, both of France

[73] Assignee: Compagnie Industrielle des Telecommunications Cit-Alcatel, Paris, France

[21] Appl. No.: 451,227

[22] Filed: Dec. 20, 1982

[30] Foreign Application Priority Data

Dec. 23, 1981 [FR] France ................. 81 24077

[51] Int. Cl.⁴ ........................................... H04B 3/20
[52] U.S. Cl. ............................................... 179/170.2
[58] Field of Search ............... 179/170.2, 170.6, 81 B; 370/32; 333/18, 166; 364/364

[56] References Cited

U.S. PATENT DOCUMENTS

| | | | |
|---|---|---|---|
| 3,732,410 | 5/1973 | Mackechnie | 235/181 |
| 4,131,767 | 2/1978 | Weinstein | 179/170.2 |
| 4,349,889 | 9/1982 | van den Elzen et al. | 364/724 |

OTHER PUBLICATIONS

"Echo and Its Control in Telecommunication Networks", M. Erdreich, Commutation and Transmission, No. 4, 1981, pp. 5–18.
"A New Digital Echo Canceller for Two-Wire Four-Wire Duplex Data Transmission", K. Mueller, I.E.E.E. Transactions on Communications, vol. COM-24, No. 9, Sep. 1976, 956-62.

*Primary Examiner*—Gene Z. Rubinson
*Assistant Examiner*—R. Vaas
*Attorney, Agent, or Firm*—Sughrue, Mion, Zinn, Macpeak, and Seas

[57] ABSTRACT

Echoes occur in telephone systems whenever signals in one channel of a two way conversation spill over into the other channel. The present echo canceller is particulary intended for use with a hands free telephone where the spill over is in the form of an acoustic echo from the loud speaker (2) to the microphone (1). The signals are sampled at a rate 1/T and are made available as digital samples. A synthetic copy of the echo signal is generated by means of an adaptive digital non-recursive time domain transversal filter. Instead of tapping the filter at unit time intervals equal to the sampling period T in the conventional manner, the filter is tapped at unit intervals equal to twice the sampling interval. For a given amount of calculation in the filter, this has the effect of doubling the length of the filter's impulse response.

3 Claims, 4 Drawing Figures

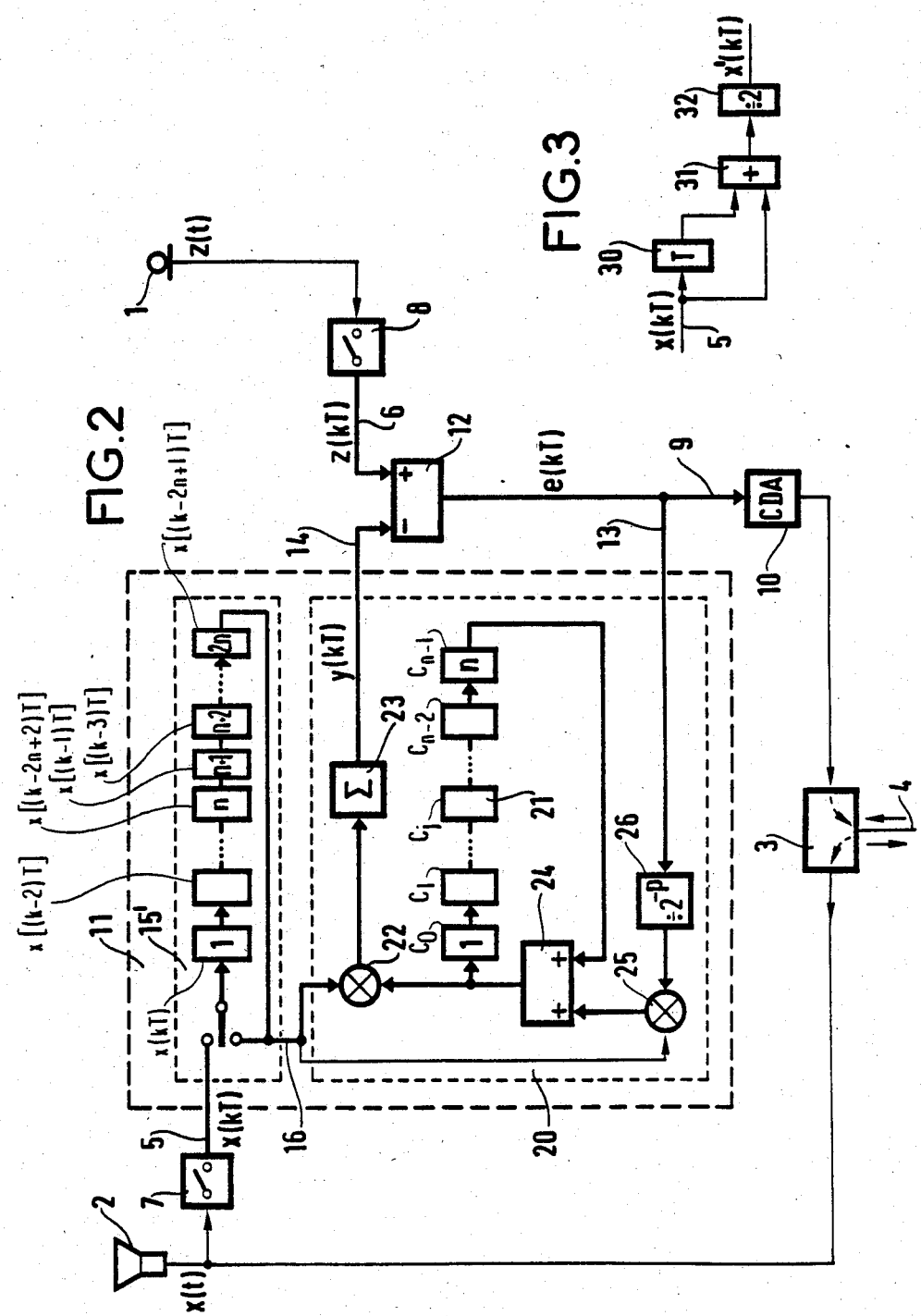

DIGITAL ECHO CANCELLER

The present invention relates to telephone transmission, and more particularly to cancelling echoes of acoustic origin present on a telephone channel due to acoustic coupling between a microphone and a loudspeaker.

BACKGROUND OF THE INVENTION

An echo canceller is a device which generates a synthetic echo signal based on a first signal which gives rise to a real echo signal, and which combines the synthetic echo signal with a second signal that is degraded by the real echo signal in such a manner as to obtain a small a residual echo signal as possible. Canceller operation is based on the fact that a real echo path can be considered as a synthesizable linear filter. A canceller comprises an adaptive filter which generates the synthetic echo signal and which is adjusted to minimize the correlation between the originating signal which gives rise to the echo and the signal which is degraded by the residual echo.

Most telephone channel echo cancellers are digitally implemented and are designed to process signals which are available in the form of a series of digital samples supplied at a regular rate 1/T which is higher than the Nyquist rate for the signals. Their adaptive filters are constituted by non-recursive time domain transversal filters comprising a delay line having intermediate tapping points spaced at intervals equal to the sampling period T, and by processor means arranged during each sampling period T to weight the samples available at the tapping points, to sum the weighted samples, and to update the weighting coefficients.

The length of the delay line determines the maximum length possible for the adaptive filter's impulse response which must be substantially equal to the reverberation time of the echo to be cancelled. The reverberation time of an acoustic echo may easily be several hundreds of milliseconds long. Since the sampling period T is generally the 125 μs period used by PCM encoding, the number of weighting coefficients that need to be used and updated turns out to be excessively large. The practical limit imposed by using processor means of reasonable power is about 250 weighting coefficients, which in a prior art echo canceller corresponds to an impulse response with a maximum duration of about 30 milliseconds, which is too short for dealing with acoustic echoes.

Preferred embodiments of the present invention increase the length of the maximum impulse response achievable for a given amount of calculation to be performed in one sampling period T.

SUMMARY OF THE INVENTION

The present invention provides a digital echo canceller for a telephone channel conveying signals which are sampled at a regular rate 1/T. The canceller comprises a non-recursive time domain transversal filter including a delay line with intermediate tapping points. The improvement is that the tapping points are spaced at intervals of twice the sampling period T, ie. at intervals of 2T.

Practice shows that, for a given quality of echo cancellation, such an echo canceller can deal with echoes that are twice as long as was possible for prior art cancellers using the same amount of calculation, or else it can deal with echoes of the same length, but using half the amount of calculation.

In a preferred embodiment, each sample of the originating signal which give rise to the real echo, is replaced by half the sum of said sample and the preceding sample before being applied to the input of the delay line of the adaptive filter.

BRIEF DESCRIPTION OF THE DRAWINGS

Embodiments of the invention are described by way of example with reference to the accompanying drawings, in which:

FIG. 2 is a block diagram of a first embodiment of the present invention, likewise for use in a hands free telephone;

FIG. 3 is a schematic diagram of a digital filter suitable for placing ahead of one of the inputs to the echo canceller shown in FIG. 2.

MORE DETAILED DESCRIPTION

Prior Art

Figure 1:
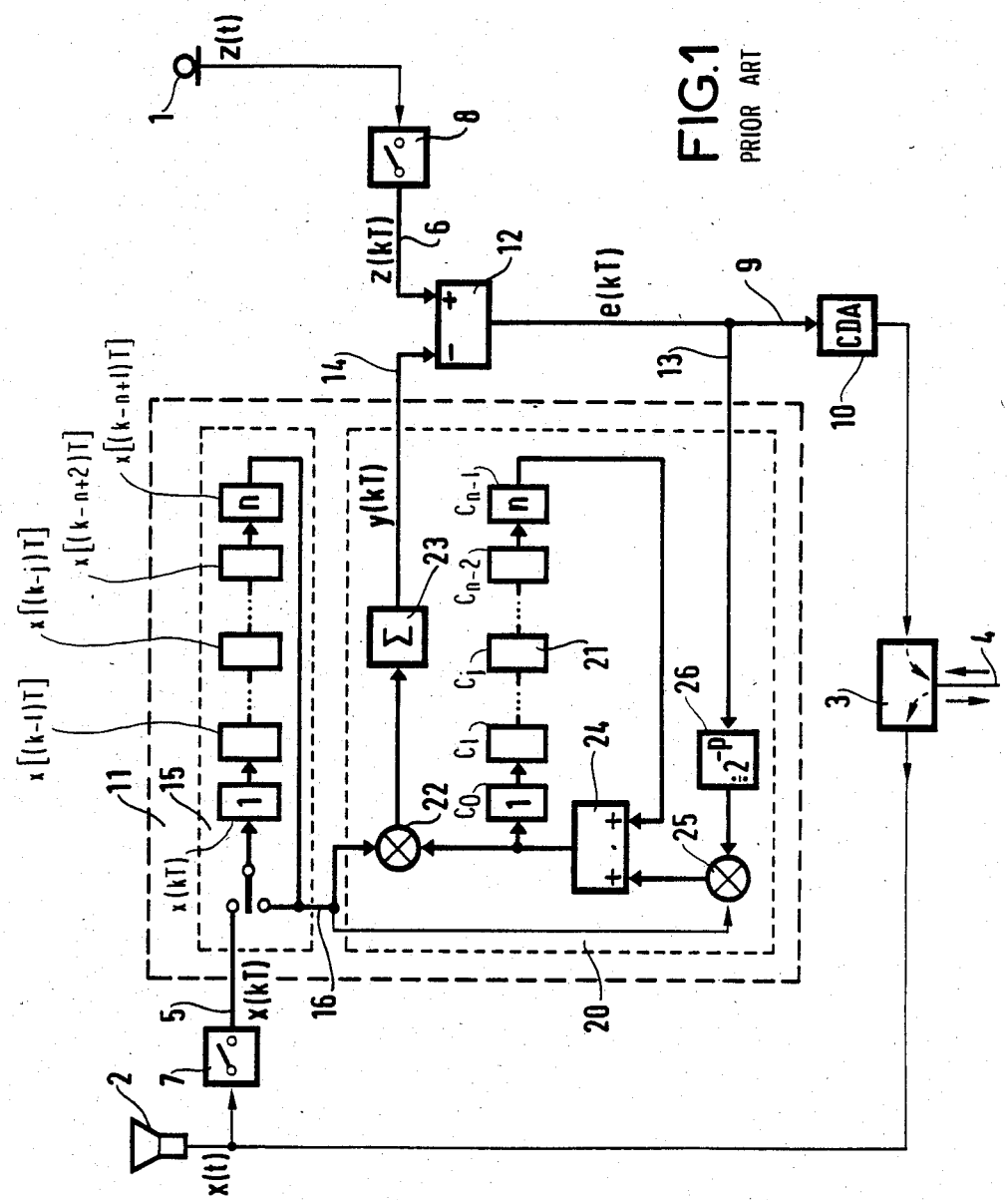
FIG. 1 is a block diagram of a prior art echo canceller for use in a hands free telephone.

FIG. 1 shows a prior art echo canceller for use in a hand free telephone. The echo canceller is disposed between a microphone 1 and a loudspeaker 2 of a hands free telephone, on the four wire side of a hybrid coupler 3 for connecting the telephone to a two wire local telephone circuit 4. The canceller is fitted to eliminate interference on the signal from the microphone 1 due to acoustic echoes from the loudspeaker 2. It has two inputs 5 and 6. The input 5 is connected to a first sampler and coder 7 to receive digital signal samples x(kT) of the signal x(t) which excites the loud speaker 2 and from which the echoes originate. The input 6 is connected to a second sampler and coder 8 to receive digital signal samples z(kT) from the signal z(t) generated by the microphone 1 and degraded by the echoes. The samples are provided synchronously at a rate 1/T equal to the 8 kHz rate used in PCM coding. The canceller has an output 9 on which it provides samples e(kT) at a rate 1/T of a microphone signal from which interference has been removed. The samples e(kT) are applied to a digital to analog converter 10 and thence to the hybrid 3.

In well known manner the echo canceller comprises an adaptive digital filter 11 which simulates the echo path and synthesizes a copy of the echo signal by filtering the samples x(kT) of the echo-originating signal x(t), together with a digital subtractor 12 which substracts samples y(kT) of the copy echo signal from the samples z(kT) of the echo-degraded signal to deliver signal samples e(kT) to the output 9 representative of the microphone signal with the echoes removed therefrom.

A first input to the digital adaptive filter 11 is the input 5 to the echo canceller. Samples x(kT) of the signal to be filtered are received thereon. A second input 13 to the filter is an adjusting input, via which it receives the samples e(kT) of the output signal from the echo canceller. The filter has an output 14 on which it delivers samples y(kT) of the copy of the echo. In conventional manner, the filter is constituted by a digital adaptive non-recursive time domain transversal filter which adapts to eliminate the echo signal as completely as possible. It comprises a delay line 15 having intermediate tapping points at unit time intervals equal to the sampling period T and which receive the samples x(kT) of the echo-originating signal. It further comprises processor means 20 which, during each sampling period T, weights the samples present on the tapping points of the delay line, sums the weighted signal samples, and updates the weighting coefficients.

The delay line 15 and its intermediate tapping points comprise a first n stage shift register. At each sampling instant a new sample is inserted at the input to the first stage and the oldest sample stored in the last stage is lost. In between two consecutive sampling instants, the first shift register is looped on itself and clocked at such a rate that samples stored therein make a complete circuit, each appearing once at a shift register output 16.

The processor means 20 comprises a second n stage shift register 21 used for storing the filter weighting coefficients $C_j$, a first two input high speed multiplier 22 and an adder accumulator 23 for calculating the samples y(kT) of the filter output signal, together with a digital adder 24, a second multiplier 25 and an attenuator 26 used for updating the weighting coefficients $C_j$.

The second shift register 21 is looped on itself via the digital adder 24 used to add updating values $\Delta C_j$ to the weighting coefficients $C_j$. The second shift register 21 is clocked in synchronism with the first shift register of the delay line 15.

The first high speed multiplier 22 has one input connected to the output of the first shift register of the delay line 15, and its other input connected to the output of the digital adder 24. It serves to weight the samples x[(k−j)T] present in the delay line 15 by means of the filter coefficients $C_j$.

The adder accumulator 23 is sampled and reset to zero before each sampling instant.

Between two successive sampling instants kT and (k+1)T, the following series of samples appears at the output from the delay line's first shift register:

x[(k−n+1)T], . . . , x[(k−1)T], x(kT).

During the same time interval, the following series of coefficients appears synchronously at the output from the digital adder 24:

$C_{n-1}$, . . . , $C_1$, $C_0$.

These two series are multiplied term by term by the first multiplier 22 to give the following series of weighted samples:

$C_{n-1}$·x[(k−n+1)T], . . . , $C_1$·x[(k−1)T], $C_0$·x(kT)

whose terms are added together in the adder accumulator 23 to give a single sample y(kT) of the copy echo signal:

$$y(kT) = \sum_{j=0}^{n-1} C_j \cdot x[(k-j)T]$$

This is the well known expression for the output signal from a digital non-recursive time domain transversal filter having a delay line with n tapping points and a time interval between successive tapping points equal to the sampling period T. It is likewise the expression for the convolution of the echo-originating signal x(t) sampled at a rate 1/T and an impulse response supposed to be equal to the impulse response of the echo path and defined by weighting coefficients $C_j$ sampled at the rate 1/T.

The impulse response of a digital filter should be as close as possible to the impulse response of the echo path, which response is not fixed data, but depends on the characteristics of each particular telephone connection. To make the filter response approach the real response, it is known to apply feedback control to the weighting coefficients $C_j$ in such a manner as to minimize the value of the correlation function between the output signal e(t) from the echo canceller and the signal x(t−jT) which is the sample of the signal x(t) that is available on the delay line tapping point corresponding to the coefficient $C_j$ under consideration. This is done in conventional manner between sampling instants kT and (k+1)T by giving the updating value $\Delta C_j$ the following value:

$$\Delta C_j = \alpha e(kT) \operatorname{sgn}[x[(k-j)T]]$$

The attenuator 26 weights the samples e(kT) of the output signals from the echo canceller by a coefficient $\alpha$ equal to $2^{-P}$. In a binary system this is simply done by shifting from left to right. The second multiplier 25 multiplies the signs of the samples going through the output from the first stage of the shift register of the delay line 15 by the value:

$$2^{-P} e(kt)$$

and delivers a series of updating values as follows between two successive sampling instants kT and (K+1)T:

$\Delta C_{n-1}$, . . . , $\Delta C_1$, $\Delta C_0$

The digital adder 24 incorporates the updating values in the weighting samples $C_j$.

The performance of the echo canceller which has just been described depends on the number n of tapping points to the delay line in its digital non-recursive transversal filter, since the maximum duration of its impulse response (which is equal to nT) must be close to the reverberation time of the echos. However, the number n is limited by the speed of the first multiplier which must perform n complete multiplications per sampling period, and by the speed at which data can be made to circulate in the shift registers.

The invention

FIG. 2 shows a first echo canceller in accordance with the invention for use in a hands free telephone. The echo canceller comprises many of the same components as those already described in relation to the prior art, and they are given the same reference numerals. The difference lies in the first shift register constituting the delay line 15', which has twice as many stages 2n, but clocks at the same rate between two consecutive sampling instants. The delay line is thus twice as long, but calculations continue to be performed at the old rate.

Doubling the number of stages in the first shift register has the effect of doubling the length of the delay line since the delay line then behaves like two n stage shift register portions placed one after the other, one of said registers receiving even numbered samples and the other receiving odd numbered samples, with the contents of the two portions being used in an alternating manner, ie. one portion between a first pair of successive sampling instants, and the other portion between the next pair, then the said one portion again, etc. The arrangement is equivalent to having two n tapping point shift registers in parallel, each being used during alternate sampling periods, or to a single delay line with n tapping points arranged every two cells along the shift register so that only even numbered or only odd numbered samples are available at the tapping points at any one time. The next result is a digital non-recursive time domain transversal filter having a delay line with n intermediate tapping points presenting samples which are at a spacing of twice the sampling period.

The sampling periods of the signals x(t), z(t) and of the impulse response are disassociated: while the signals are still sampled at a period T, the impulse response is sampled at a period 2T. In the time domain that has the advantage of doubling the duration for which the filter is active. However, in the harmonic domain the harmonic response is subject to a constraint, namely that its transfer function has a periodicity of 4 kHz with imaginary conjugates for any pair of frequencies disposed symmetrically about 2 kHz. This is clearly not the case for the acoustic harmonic response of the room in which the echoes are made. The adaptation of the weighting coefficients makes the best compromise between the possibly conflicting requirements of a lower band from 300 Hz to 2000 Hz and of an upper band from 2000 Hz to 3400 Hz. Practice shows that in a telephone conference room, a filter in accordance with the invention provides the same 7 dB of echo cancellation using only 128 weighting coefficients as does a prior art echo canceller using 256 weighting coefficients.

Performance may be further improved by digitally pre-processing the signal x(t) by means of a filter shown in FIG. 3 before applying the signal to the adaptive filter of the echo canceller. The pre-processing filter comprises a two tapping point delay line constituted by a delay circuit 30 introducing a delay of one sampling period T, a digital summing circuit 31 for adding the signals available at the input and at the output of the delay circuit 30, and an attenuator 32 for dividing the summed samples by two at the output from the summing circuit 31.

The samples x(kT) of the signal x(t) for exciting the loud speaker are transformed by the filter into samples x'(kT), where:

$$2x'(kT) = x(kT) + x[(k-1)T]$$

Before being applied to the self adaptive filter of the echo canceller, each sample is thus replaced by half the sum of said sample and the immediately preceding sample.

This second version corresponds to sampling the impulse response with a period T, but using successive pairs of weighting coefficients that are equal in value. A more accurate description is thus provided of the exciting signal x(t). Simulation has shown that where the first embodiment of the invention on its own could theoretically give up to 25 dB echo attenuation, the same embodiment with the pre-processing filter could give up to 30 dB attenuation.

More generally, an echo canceller in accordance with the invention may comprise a digital adaptive nonrecursive time domain transversal filter having a composite delay line which begins with a first section having a small number of tapping points separated by a unit interval equal to the sampling period T, and ending in a second section having a large number of tapping points separated by a unit interval which is twice the sampling period. In a hands free telephone, this arrangement deals both with the short reverberation period echo due to direct coupling between the microphone and the loud speaker, and with the long reverberation period echo due to indirect coupling between the microphone and the loud speaker via the walls of the room in which the hands free telephone is installed.

Figure 4:
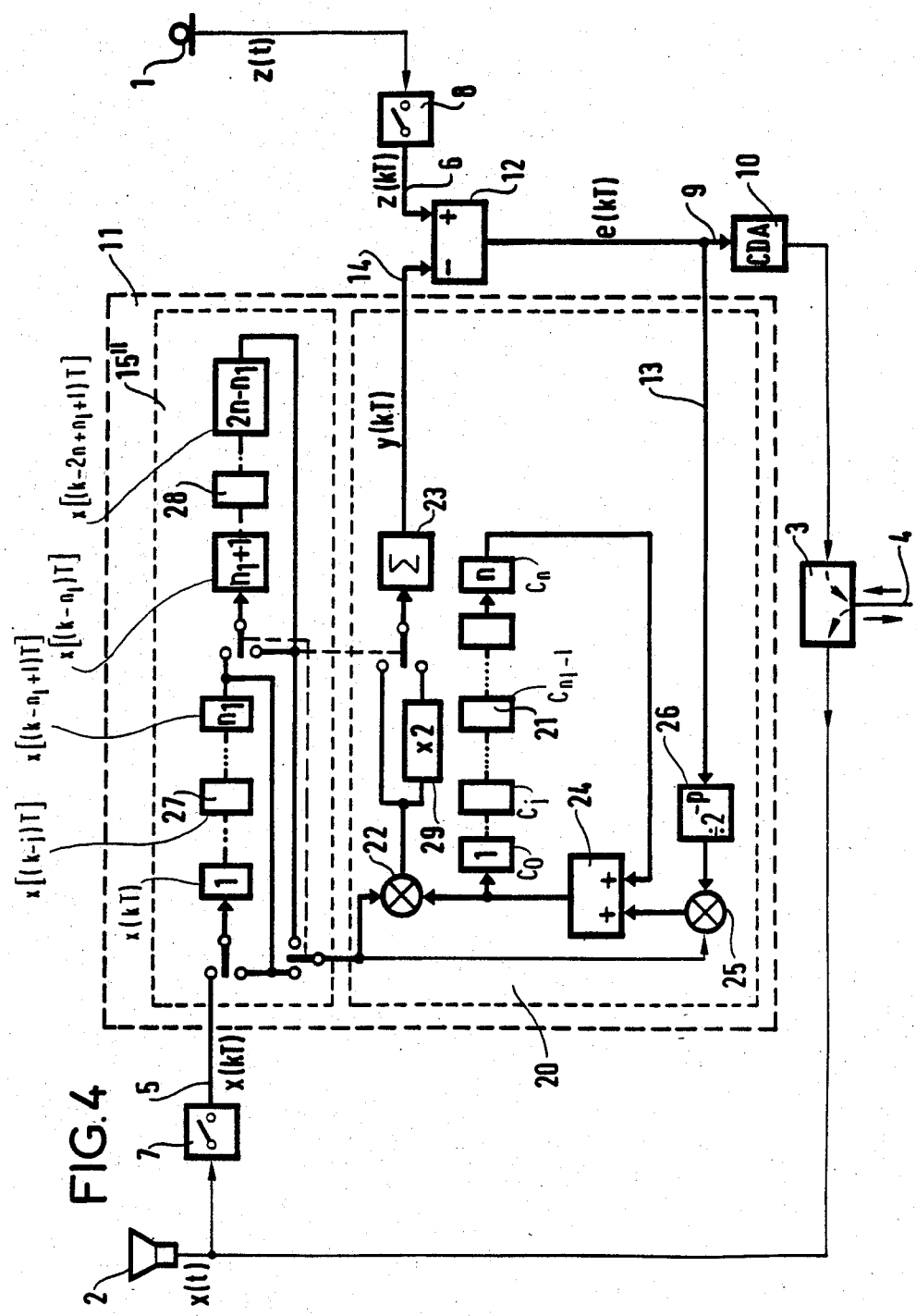
FIG. 4 is a block diagram of a second embodiment.

FIG. 4 shows an echo canceller of this type. Most of its components are the same as those described with reference to FIGS. 1 and 2, and these components have the same reference numerals as before. The difference lies in the delay line 15" which is constituted by two cascaded shift registers 27 and 28 together with a set of switches, and in a doubling circuit 29 which may be switched in and out of circuit between the first multiplier 22 and the adder accumulator 23.

The shift register 27 has a small number $n_1$ of stages and constitutes the first portion of the delay line 15". At each sampling instant its input is connected to the input 5 of the echo canceller and its output is connected to the input of the shift register 28. Its first stage thus receives each new sample x(kT) of the loud speaker exciting signal, and its last stage transfers the sample $$x[(k - n_1 T)]$$

to the shift register 28. Between two successive sampling instants, the shift register 27 is looped to itself and is disconnected both from the input 5 of the echo canceller and from the shift register 28.

The shift register 28 has a large number $2(n - n_1)$ of tapping points and constitutes the second section of the delay line 15". At the sampling instants its input is connected to the output from the shift register 27 to receive the oldest sample stored therein, while the sample stored in its last stage is lost. Between two successive sampling instants, the shift register 28 is disconnected from the shift register 27 and is looped on itself.

Between two successive sampling instants the input to the first multiplier 22 is initially connected to the output from the shift register 27 which receives $n_1$ clock pulses in synchronism with the first $n_1$ clock pulses applied to the second shift register 21 which stores the weighting coefficients. Thereafter the input to the first multiplier 22 is connected to the output from the shift register 28 which receives $n - n_1$ clock pulses in synchronism with the remaining $n - n_1$ pulses applied to the second shift register 21. Thus between two successive sampling instants, firstly all the samples of the signal x(t) stored in the shift register 27 are applied successively to the first multiplier 22, and secondly one half of the samples x(t) stored in the shift register 28 are applied thereto, said half alternating between even numbered samples and odd numbered samples. The doubling circuit 29 is out of circuit when the first multiplier 22 is conected to the shift register 27 and it is in circuit when the multiplier is connected to the shift register 28. As a result, the output from the adder accumulator 23 is a weighted sum of all the samples stored in the shift register 27 and of all the odd numbered or all the even numbered samples stored in the shift register 28 in alternation. This gives rise to a synthetic or copy echo signal sample y'(kT) of the form:

$$y'(kT) = \sum_{j=0}^{n_1-1} C_j \cdot x[(k-j)T] + 2 \sum_{j=n_1}^{n-1} C_j \cdot x[(k+n_1-2j)T]$$

which corresponds to a digital non-recursive time domain transversal filter having a delay line with a first section having $n_1$ tapping points at a unit time interval equal to one sampling period T and a second section having $n-n_1$ tapping points at a unit time interval equal to twice the sampling period T.

The coefficient 2 which appears in the second sum term comes from the doubler circuit 29. It corrects the effects of differing coefficient convergence rates due to the fact that the $n_1$ first coefficients are updated every time while the $2n-n_1$ remaining coefficients are only updated every other time.

We claim:

1. A digital echo canceller for use in telephone equipment having first and second channels such that an originating telephone signal x(t) on the first channel is capable of giving rise to a real echo telephone signal z(t) on the second channel, the telephone signals being base band telephone signals, the canceller comprising an adaptive filter for generating a synthetic echo signal y(t) from the originating signal x(t), and means for combining the real echo signal z(t) and the synthetic echo signal y(t) to substantially cancel the real echo signal, thereby leaving a residual echo signal e(t), said adaptive filter adapting itself in such a manner as to minimize the correlation between the originating signal x(t) and the residual echo signal e(t) and comprising processor means and a non-recursive time domain transversal filter constituted by a delay line with intermediate tapping points, said adaptive filter receiving successive signal samples derived by sampling the originating signal x(t) at a sampling rate of 1/T, and being arranged during each sampling period T to weight samples available at said tapping points using a set of weighting coefficients, to sum the weighted samples to produce a sample of the synthetic echo signal y(t), and to update the weighting coefficients; wherein said tapping points along the delay line are separated by a unit time interval which is equal to twice the sampling period T.

2. An echo canceller according to claim 1, further including a pre-processing circuit preceding said delay line with a unit tapping interval equal to twice the sampling period T, said pre-processing circuit serving to replace each digital sample it receives of the signal x(t) with a sample equal to half the sum of said received sample and a preceding received sample.

3. An echo canceller according to claim 1, wherein said delay line includes a relatively short portion having tapping points at a unit time interval equal to the sampling period T and a relatively long portion having tapping points at unit time intervals equal to twice the sampling period T.

* * * * *